(No Model.)
C. FRANKENFIELD.
FEED PIPE FOR WATER TANKS.
No. 280,809.          Patented July 10, 1883.
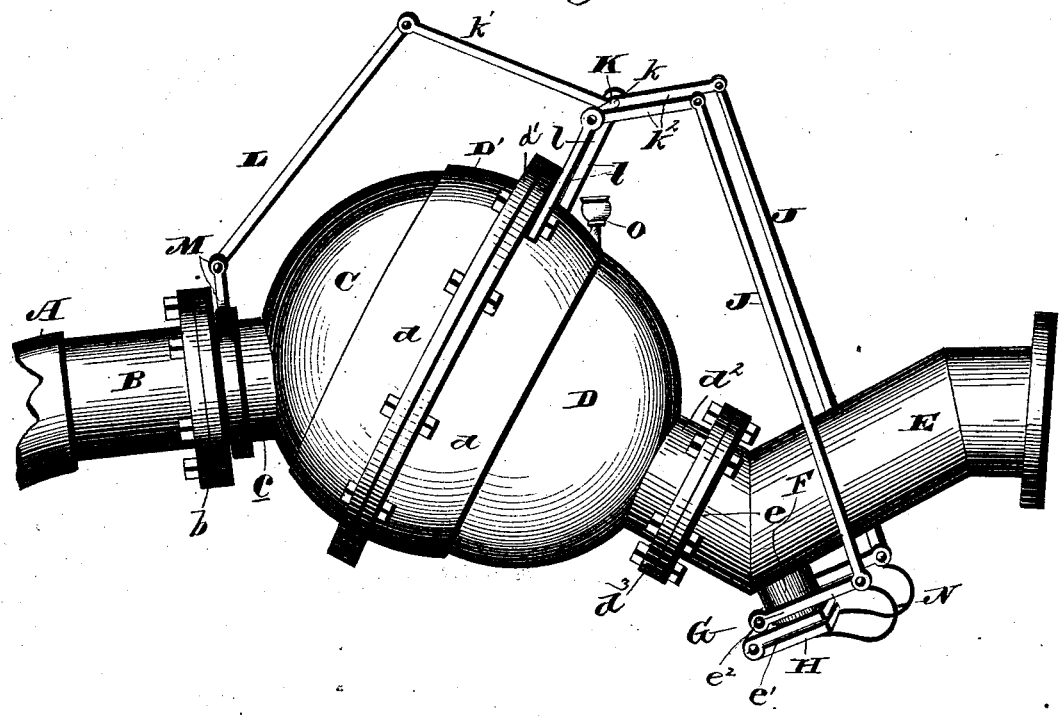
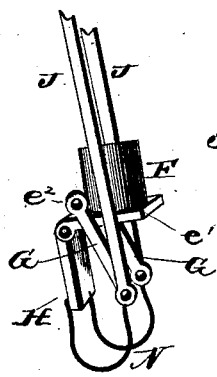
WITNESSES
S. G. Nottingham
G. F. Downing
INVENTOR
Chas Frankenfield,
By H. A. Symons
Attorney

UNITED STATES PATENT OFFICE.

CHARLES FRANKENFIELD, OF STROUDSBURG, PENNSYLVANIA.

FEED-PIPE FOR WATER-TANKS.

SPECIFICATION forming part of Letters Patent No. 280,809, dated July 10, 1883.

Application filed March 17, 1883. (No model.)

*To all whom it may concern:*

Be it known that I, CHARLES FRANKENFIELD, of Stroudsburg, in the county of Monroe and State of Pennsylvania, have invented certain new and useful Improvements in Feed-Pipes for Water-Tanks; and I do hereby declare the following to be a full, clear, and exact description of the invention, such as will enable others skilled in the art to which it pertains to make and use the same.

My invention relates to feed-pipes for water-tanks, the object being to provide the water-tanks of railroads with a feed-pipe of improved construction, whereby the annoyance and inconvenience incident to the freezing of the water in the pipe and the waste and dripping of the water are avoided.

The invention consists in the features of construction and combinations of parts hereinafter fully described, and pointed out in the claims.

In the drawings, Figure 1 represents a perspective view of my improvement, and Fig. 2 is a view of my improved valve detached.

A represents the feed-pipe proper, which is of the usual form, and downwardly turned at its outer end, and secured at its inner end to a sleeve, B, provided with an annular flange or collar, $b$, adapted to be bolted to a similar flange, $b^3$, formed on the tubular portion $c$ of the hollow ball-section C of a ball or socket joint. The latter consists of the semi-spherical portion D, provided with an annular flange, $d$, and a ring portion, D', having a flange, $d'$, adapted to be bolted to the flange $d$ of section D. Said ring D' surrounds and supports the hollow ball-section C, which latter is open at its inner side to permit the passage of water, and is formed integral with the tubular portion $c$.

The inner end of the socket D is provided with a tubular extension, $d^2$, having a collar, $d^3$, adapted to be bolted to a similar collar, $e$, formed on a bent pipe, E, secured to the tank, and provided with any preferred form of valve for admitting water thereto from the tank.

Upon the under side of pipe E, at its lowest point, is formed a waste-pipe, F, internally screw-threaded, for a purpose hereinafter explained. This pipe F is provided with a flange, $e'$, having bearings $e^2$ $e^2$, to which are respectively pivoted parallel arms G G and a flap-valve, H.

The arms G G are pivotally connected to parallel rods J J, extending upwardly and forwardly, one on each side of the pipe E, and pivotally secured at their upper ends to a rock-frame, K. The latter consists of a cross-bar, $k$, pivotally supported by parallel arms $l$ $l$, rigidly secured to the flange $d$ of the socket D, a forwardly-projecting arm, $k'$, and two rearwardly-projecting arms, $k^2$ $k^2$, to which the rods J J are connected. The arm $k'$ of the rock-frame K is connected to the tubular extension $c$ of the ball C by a rod or chain, L, secured at its forward end to an eye, $m$, of a collar, M, the latter resting in an annular groove formed in the tube $c$ in rear of the flange $b^3$.

The free end of the flat valve H is connected to the arms G G by a spring, N, preferably a flat bent spring, as shown.

O represents an oil-cup arranged upon or formed integral with the socket D, to admit of the lubrication of the ball or socket joint.

The device as thus constructed is adapted to operate as follows in the cold season, when freezing of the water in the pipes is to be avoided: When the pipe A is turned down to supply water to a locomotive, the waste-valve H will be closed, as illustrated in Fig. 1, and the valve of the tank will be opened to supply the water. Upon closing the tank-valve and turning said pipe upwardly the rock-frame K will be tilted, thus forcing downward the rods J J and arms G G and opening the valve H to discharge all water remaining in the bent pipe E, thus effectively preventing the freezing of said waste water within the pipe.

In the summer season, when there is no liability of the freezing of the water, the waste-valve H and its connecting and operating devices may be removed from the pipe and a screw-plug inserted into the depending interiorly-threaded pipe F. The waste-water will thus be confined within the pipe E, and all waste of water will be avoided.

The ball-and-socket joint described will allow a horizontal as well as a vertical movement of the pipe A, thus avoiding the strain or breakage of the latter in case of a slight movement of the locomotive after the pipe has been connected to the tender.

It will be apparent that various changes and modifications in the details of construction of my improvement may be resorted to without departing from my invention.

I do not limit myself to any particular manner of oiling or packing the joint or other parts of the device. If desired, any suitable casing may be provided in winter to prevent freezing or clogging, and the waste-valve may be provided with a funnel or pipe to carry off the waste-water; also, I desire it to be understood that any suitable form of spring may be employed in connection with the waste-valve, and, instead of the valve here shown, a slide or other suitable valve may be employed; also, a weight and pulley might be used to tilt the rock-frame K and open the waste-valve. I therefore do not limit myself to the construction herein described and shown, but reserve to myself the right to make all such changes in form and construction as may properly fall within the scope of my invention.

Having fully described my invention, what I claim as new, and desire to secure by Letters Patent, is—

1. The combination, with a downwardly-turned supply-pipe, of a socket or casing secured thereto and a feed-pipe secured to a ball supported within said socket or casing, and automatic connections between said pipe and socket, whereby the pipe may be raised and lowered without waste of water, substantially as set forth.

2. The combination, with a feed-pipe for water-tanks, of a ball or socket joint, the socket-section of said joint being secured to a downwardly-inclined or bent pipe provided with a waste-valve and mechanism for connecting said valve with the pipe, so that when the latter is raised and lowered the valve will be respectively opened and closed, substantially as set forth.

3. The combination, with the feed-pipe having a ball-and-socket joint secured to a downwardly curved or bent pipe, of a waste-valve arranged at the lowest point upon said bent pipe and provided with means for automatically opening and closing said valve when the feed-pipe is raised and lowered, substantially as set forth.

4. The combination, with the downwardly-bent pipe provided with a waste-valve, as described, and the feed-pipe having a ball-and-socket joint, of arms rigidly secured to said joint and supporting a rock-frame, and arms and rods for connecting said frame with the feed-pipe and waste-valve, substantially as set forth.

5. The combination, with the feed-pipe having a ball-and-socket joint, and the downwardly-bent pipe, of a waste-valve adapted to be operated by a rock-frame and connecting-rods and attached to said rods by a spring, substantially as set forth.

6. The combination, with the feed-pipe and downwardly-bent pipe, of a pivoted spring-valve and means connected with said feed-pipe for automatically operating the same to discharge waste water, substantially as set forth.

7. The combination, with the ball-and-socket joint of the feed-pipe, of an oil-cup, substantially as set forth.

8. The combination, with the flanged sections of the ball-and-socket joint, of arms or posts $l$ $l$, rigidly secured thereto and adapted to support the shaft of a rock-frame, K, and connections for opening and closing the waste-valve, substantially as set forth.

In testimony whereof I have signed this specification in the presence of two subscribing witnesses.

CHARLES FRANKENFIELD.

Witnesses:
 JOHN S. STAPLES,
 JOHN N. SHIVELY.